United States Patent
Grubb et al.

(10) Patent No.: US 7,695,548 B1
(45) Date of Patent: Apr. 13, 2010

(54) FLUID FILTRATION TOOL

(75) Inventors: William A. Grubb, Tulsa, OK (US); Carl G. Woodworth, Ramona, OK (US); Mark D. Fajt, Paoli, OK (US); Steve Smith, Bartlesville, OK (US)

(73) Assignee: Global Oilfield Services LLC, Houston, TX (US)

( * ) Notice: Subject to any disclaimer, the term of this patent is extended or adjusted under 35 U.S.C. 154(b) by 660 days.

(21) Appl. No.: 11/535,225

(22) Filed: Sep. 26, 2006

(51) Int. Cl.
*B01D 19/00* (2006.01)

(52) U.S. Cl. .............................. 95/261; 96/217; 96/219; 166/105.5; 166/265

(58) Field of Classification Search ................. 95/261; 96/177, 195, 196, 208–217, 219; 166/105.6, 166/105.5, 105.1, 265
See application file for complete search history.

(56) References Cited

U.S. PATENT DOCUMENTS

| | | | |
|---|---|---|---|
| 1,329,171 A * | 1/1920 | Garry et al. | 166/105.1 |
| 1,455,871 A * | 5/1923 | Fleming | 166/105.1 |
| 3,730,268 A | 5/1973 | Burnside | |
| 4,241,787 A | 12/1980 | Price | |
| 4,296,810 A | 10/1981 | Price | |
| 4,481,020 A * | 11/1984 | Lee et al. | 96/214 |
| 4,769,156 A | 9/1988 | Watts | |
| 4,977,958 A * | 12/1990 | Miller | 166/205 |
| 4,981,175 A * | 1/1991 | Powers | 166/265 |
| 5,516,360 A * | 5/1996 | Normandeau et al. | 96/207 |
| RE35,454 E | 2/1997 | Cobb | |
| 5,664,628 A | 9/1997 | Koehler et al. | |
| 5,881,812 A | 3/1999 | Malbrel et al. | |
| 6,352,111 B1 | 3/2002 | Bode et al. | |
| 6,382,317 B1 | 5/2002 | Cobb | |
| 6,382,318 B1 | 5/2002 | Whitlock | |
| 6,595,280 B2 | 7/2003 | Traylor | |
| 6,602,059 B1 | 8/2003 | Howell et al. | |
| 6,719,050 B2 * | 4/2004 | Longacre | 166/265 |
| 6,736,880 B2 | 5/2004 | Ford et al. | |
| 6,758,344 B2 | 7/2004 | Gordon | |
| 6,761,215 B2 * | 7/2004 | Morrison et al. | 166/105.5 |
| 6,860,921 B2 | 3/2005 | Hopper | |
| 6,875,364 B2 | 4/2005 | Gordon | |
| 6,929,064 B1 | 8/2005 | Susman | |
| 2003/0042017 A1 | 3/2003 | Traylor | |
| 2003/0155313 A1 | 8/2003 | Gordon | |
| 2003/0155314 A1 | 8/2003 | Gordon | |
| 2005/0139531 A1 | 6/2005 | Gordon | |
| 2005/0199551 A1 | 9/2005 | Gordon | |
| 2005/0241282 A1 | 11/2005 | Gordon | |

* cited by examiner

*Primary Examiner*—Duane Smith
*Assistant Examiner*—Douglas J Theisen
(74) *Attorney, Agent, or Firm*—Baker Botts L.L.P.

(57) ABSTRACT

A dual use fluid filtration tool to separate both solids and gas from a fluid. The fluid filtration tool is suspended from and connected to a downhole submersible pump having a motor which rotates a shaft. The tool includes a housing having a cylindrical wall with a plurality of perforations therethrough and an interior chamber therein. A removable cylindrical filter surrounds the interior chamber of the housing in order to filter solid particles. At least one centralizer bearing within the interior chamber of the housing centralizes the shaft which passes therethrough. The fluid in the interior chamber is radially induced in order to separate gas from fluid. The gas separated from the fluid is directed out of the chamber while the fluid remaining in the interior chamber is directed to the intake of the downhole pump.

13 Claims, 2 Drawing Sheets

FLUID FILTRATION TOOL

BACKGROUND OF THE INVENTION

1. Field of the Invention

The present invention is directed to a dual use or combination fluid filtration tool to separate both solid particles and gas from fluid. In particular, the present invention is directed to a dual use fluid filtration tool to separate both solid particles and gas wherein the tool is used with a downhole submersible pump having a motor which rotates a shaft that passes through the tool.

2. Prior Art

Various types of pumps and similar devices are used to move fluids from beneath the surface of the earth to the surface. Well known applications include oil and gas wells and water wells. A typical downhole arrangement would include a string composed of a series of tubes or tubing suspended from the surface. One type of well-known pump is a downhole electrical submersible pump. The electrical submersible pump either includes or is connected to a downhole motor which is sealed so that the whole assembly is submerged in the fluid to be pumped. The motor is connected to a power source at the surface and operates beneath the level of fluid downhole in order to pump the fluid to the surface. A component is connected to the motor which prevents well fluid from entering the motor and equalizes internal motor pressure with the well annulus pressure. The component is commonly known as a protector, seal or equalizer.

Single stage submersible pumps are utilized in drainage and industrial pumping applications. Multiple stage submersible pumps are often used in oil wells and include a staged series of centrifugal pumps to move the fluid to the surface.

A number of factors may be detrimental to the production of an electrical submersible pump. One detrimental factor is the presence of foreign solid particles, such as sand, sediment, and scale. The amount and size of foreign solid particles in the fluid may vary widely depending on the well and the conditions encountered. In enhanced recovery operations, for example, fluids may be pumped down the well to stimulate production causing additional movement of sands and solids. The solid particles act as abrasives and, over time, are detrimental to the operation of the pump. Pumps and motors may rotate at from 2575 to 4600 rpm and have tight clearances and, accordingly, are not tolerant of solids.

A further detrimental factor is encountered in wells which contain an excess amount of gas or gas bubbles. If too much gas or gas bubbles enters the intake of the pump, it will cause the pump to decrease in efficiency. It is known that the electrical submersible pumps have dramatically lower efficiencies with significant fractions of gas. At some point, the pump may become "gas locked" and damage to the pump and/or motor may result.

Various proposals in the past have been made to filter solid particles from fluid pumps. Various proposals have also been made in the past to prevent or alleviate gas lock conditions from fluid pumps. Some of the various prior art proposals in the past include the following:

Miller (U.S. Pat. No. 4,977,958) discloses a pump filter which connects to a lower end of a pump with a mandrel 50, a surrounding filter sock and surrounding tubular casing with perforations to filter sand and other solids.

Cobb (U.S. Pat. No. 6,382,317) discloses a gas-solid separator 34 in a string with a pump 18 wherein a separator 34 has an outer tubular member 44. A gas spiral 66 directs gas upwardly in an annulus for discharge. A solid spiral 70 separates solids from the liquid.

Cobb (U.S. Reissue Pat. No. RE 35,454) discloses a downhole solid particle separator including an inner tube within an outer tube which is located below a pump. A spiral guide defines an orifice for the fluid. In the FIG. 6 embodiment, a gas trap tube 33$b$ traps gas in the fluid.

Burnside (U.S. Pat. No. 3,730,268) discloses a well filter device 10 having an outer shell 11 with slots 12 and an inner cylindrical screen 13 which is coaxial with a shell used to remove foreign materials standing in a well casing.

Price (U.S. Pat. Nos. 4,241,787 and 4,296,810) discloses a separator assembly 32 for separating oil and water having an outer shell connected to a pump intake, a lower end having perforations and a collector tube with a laminated filter element.

Koehler et al. (U.S. Pat. No. 5,664,628) discloses a downhole filter which includes a perforated inner support member 11 with one or more layers 13 of porous filter medium wrapped around inner support member 11.

Malbrel et al. (U.S. Pat. No. 5,881,812) discloses a downhole filter having an inner support member 10, a filter body surrounding the inner support member and an external cage 24.

Bode et al. (U.S. Pat. No. 6,352,111) discloses a downhole filter 18 including a perforated inner member 31 and a filter membrane 33 which is wrapped around an inner member.

Ford et al. (U.S. Pat. No. 6,736,880) discloses a gas separator used in conjunction with a pump and motor including an interior cavity with a rotary separator and a vertical gas outlet passage 46.

Hopper (U.S. Pat. No. 6,860,921) discloses a downhole centrifugal liquid/gas separator located above a pump 26.

Notwithstanding the foregoing, there remains a need to provide a combination or a dual use downhole fluid filtration tool that will be capable of separating solids and solid particles from fluid and also a need to prevent an undue amount of gas from entering the fluid prior to entering the pump.

There also remains a need to provide a combination or dual use fluid filtration tool which will be connected to and be suspended from a submersible pump and operate as an intake to said pump.

While it is possible to add filtering components on to existing equipment, it is not desirable to increase the outside diameter of the equipment.

There also remains a need to provide a combination or dual use downhole fluid filtration tool that has an outside diameter no greater than the outside diameter of the existing downhole components.

SUMMARY OF THE INVENTION

The present invention is directed to a dual use or combination fluid filtration tool to separate both solids and gas from a liquid. The fluid filtration tool of the present invention is connected to and suspended from an electrical submersible pump. A motor having a shaft and other equipment is suspended from the fluid filtration tool.

The fluid filtration tool might also be employed with other forms of artificial lifting systems.

Fluid filtration tool includes a cylindrical housing having a first end terminating in an adapter to connect with the motor or a fluid expansion chamber for the motor. An opposed, second end of the tool includes an adapter which connects with the electrical submersible pump.

The cylindrical housing includes a plurality of perforations which permit fluid to pass from the wellbore into an interior chamber or chambers within the cylindrical housing. Surrounding the interior chamber of the housing is a removable, cylindrical filter. The cylindrical filter has openings to permit gas and liquid to pass therethrough but to prevent solid particles over a certain size from passing into the interior chamber.

A shaft passes axially through the tool. The shaft on a first end will pass through the tool and be connected to the electric motor and/or other equipment. The shaft on an opposed, second end will pass through the tool and be connected to the submersible pump. Fluid in the wellbore will move through the cylindrical filter and into the interior chamber of the housing.

The shaft is permitted to rotate within the interior chamber of the tool by action of the motor and/or other equipment. A plurality of centralizing bearings surround the shaft and keep the shaft axially aligned. The bearings have openings therein in order to permit fluid to pass therethrough.

A mechanism is provided to radially induce fluid in the chamber in order to separate gas from liquid therein. A two-stage mechanism including a helical fan extending from and driven by the shaft and a paddle wheel extending from the shaft may be employed. Fluid in the chamber is directed toward a gas gathering chamber. The centrifugal force created by radially inducing a fluid causes liquid to migrate radially outward. Gas or gas bubbles will tend to remain near the axis of the interior chamber where they are directed out of the interior chamber through a passageway extending from an axially central location in the gas gathering chamber radially out of the housing. Liquid in said interior chamber is directed from a passageway near the cylindrical wall to the intake of the pump.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
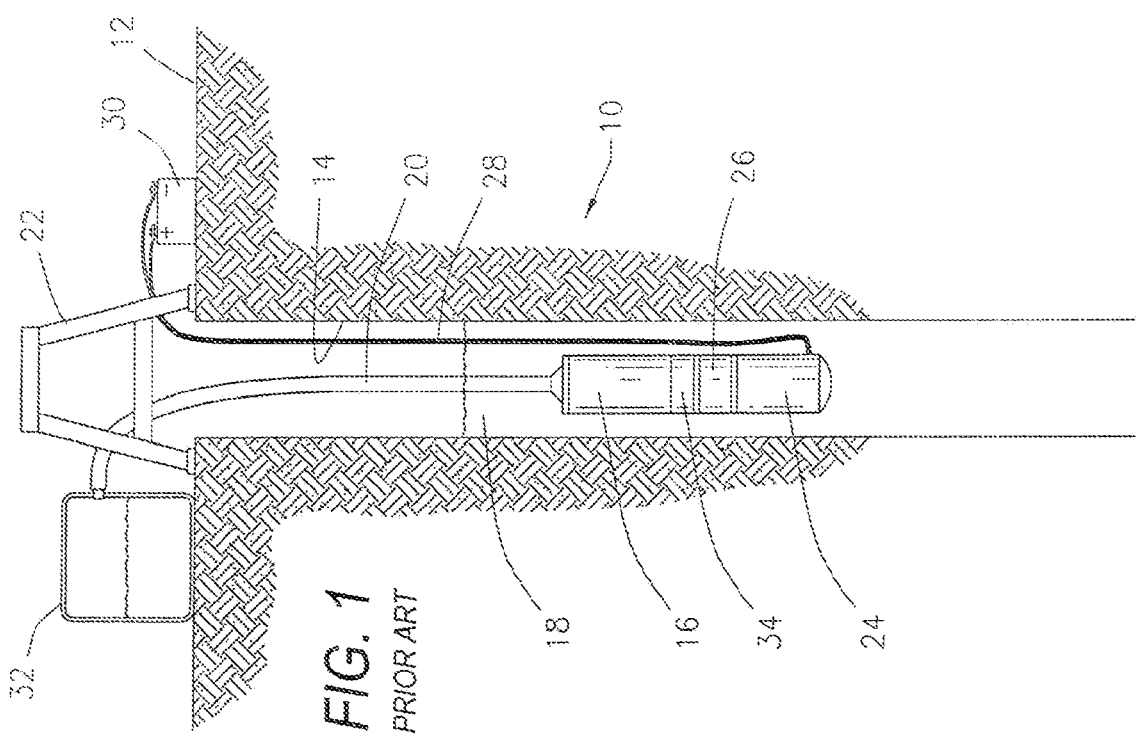
FIG. 1 is a cross sectional view of a prior art downhole arrangement before application of the present invention.

Referring to the drawings in detail, FIG. 1 illustrates a cross-sectional view of an existing, known downhole arrangement used to raise fluids to the surface 12. A subterranean well 10 includes a casing 14 which extends from the surface 12 downhole. The casing 14 is perforated so that fluid passes through the casing. An electrical submersible pump 16 is lowered into the well 10 beneath the level of fluid 18.

The electrical submersible pump 16 is suspended from a string 20 which may be composed of a series of tubes or tubing suspended from the surface 12, such as from a rig or derrick 22, all as is well known in the art. Suspended from the submersible pump 16 is a motor 24 which may include a lubrication expansion chamber or protector 26 for lubrication fluids used in the motor. The motor and expansion chamber are sealed from the fluids in which they are submersed.

Electrical energy to power the motor 24 is supplied by a conduit 28 which extends to an energy source at the surface 12, such as a generator 30.

The submersible pump 16, the motor 24, and the fluid expansion chamber or protector 26 in all cases are smaller than the interior diameter of the casing 14.

Fluid which is downhole enters the pump 16 through radially arranged pump openings in a pump intake 34.

Fluid is forced by operation of the motor 24 and the pump 16 upward through the tubing to the surface 12 where it may be gathered in a tank 32 or may be otherwise delivered by a pipeline or other means.

Figure 2:
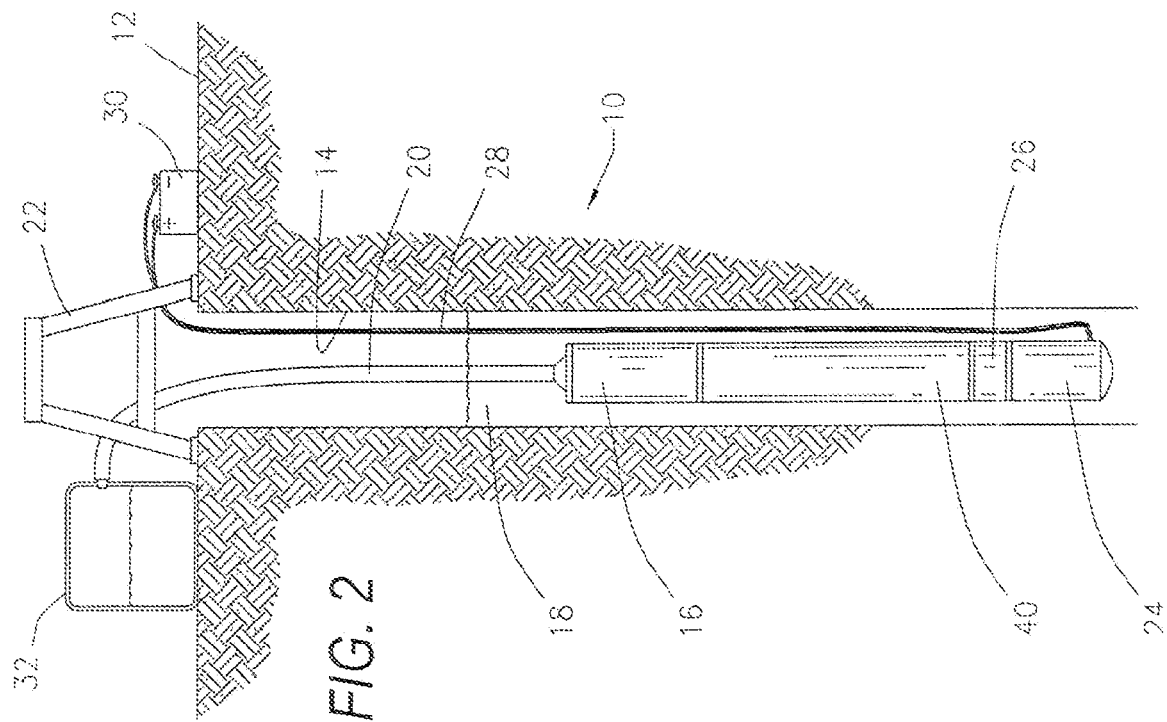
FIG. 2 is a cross sectional view of a downhole arrangement incorporating the teachings of the present invention.

FIG. 2 illustrates a downhole arrangement including and incorporating a fluid filtration tool 40 of the present invention. As will be explained in detail herein, suspended from the submersible pump 16 is a fluid filtration tool 40. The tool 40 is shown and described in a preferred arrangement although the invention is adapted to operate with various existing equipment.

Figure 3:
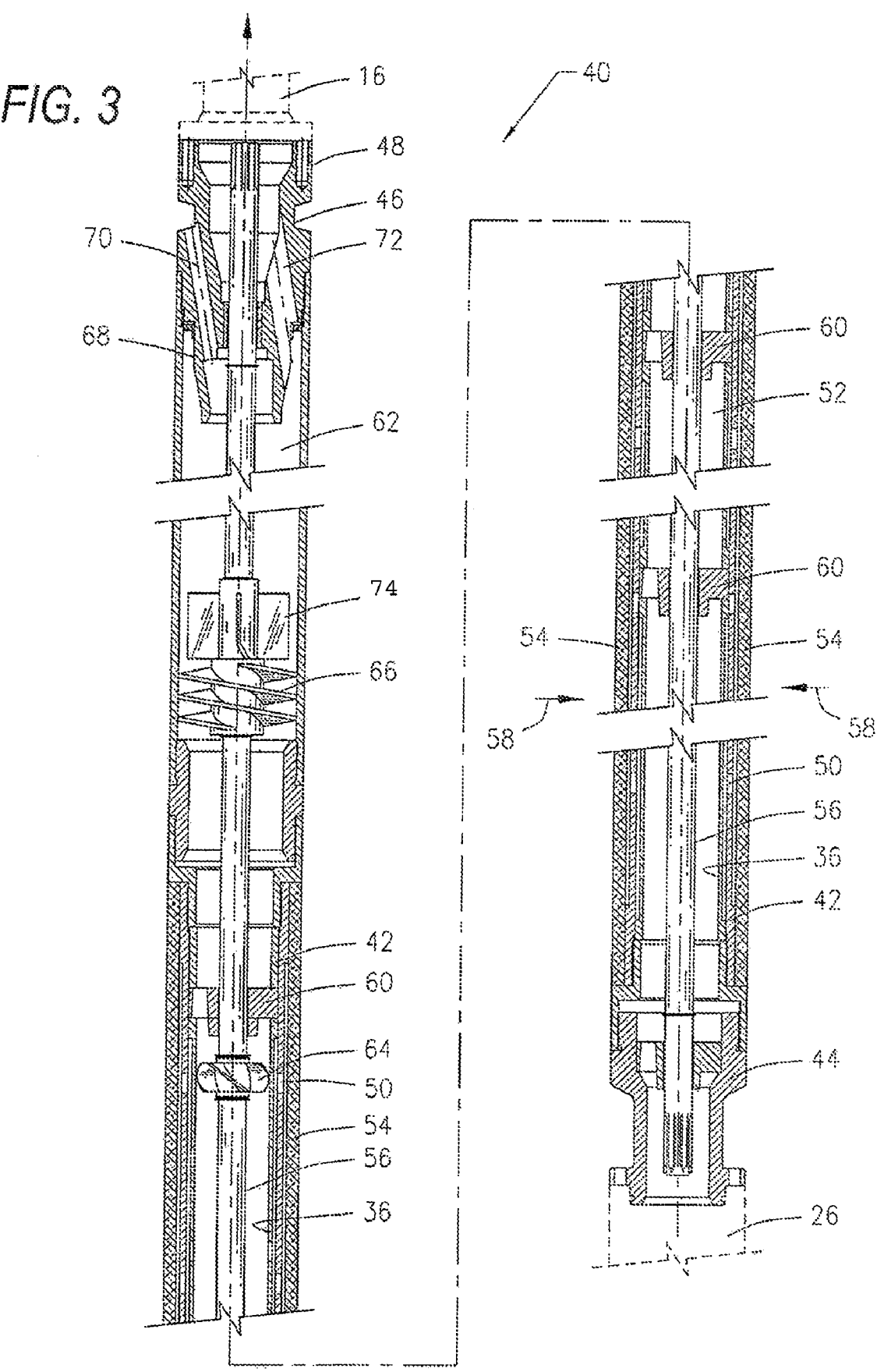
FIG. 3 is a sectional view of a fluid filtration tool constructed in accordance with the present invention.

FIG. 3 illustrates a sectional view of the fluid filtration tool 40 which includes a cylindrical housing 42. The housing 42 may include a first end terminating in a base 44 which will connect with the motor 24 or a fluid expansion chamber or protector 26 for the motor (shown in dashed lines in FIG. 3). The first end base 44 may have a reduced diameter neck and a flange to be bolted to a flange on the fluid expansion chamber 26.

An opposed, second end 46 of the tool 40 includes an adapter 48 which connects with the intake end of the pump 16 (shown in dashed lines in FIG. 3). The second end adapter 48 may have a reduced diameter neck and a flange to be bolted to a flange on the pump 16. Accordingly, the fluid filtration tool 40 is juxtaposed between the pump and the motor and/or fluid expansion chamber or protector.

The cylindrical housing 42 includes a plurality of perforations 50 which permit fluid to pass from the wellbore into an interior chamber or chambers 52 within the cylindrical housing 42. Located within the housing 42 are perforated tubes 36 which have outside diameters slightly less than inside the diameter of the housing.

Surrounding the interior chamber 52 of the housing 42 is a removeable, cylindrical filter 54. The cylindrical filter 54 has openings to permit gas and liquid to pass therethrough but to prevent solid particles over a certain size from passing into the interior chamber 52 of the housing 42.

The cylindrical filter 54 may be removed and replaced from time to time as necessary. The cylindrical filter has an external diameter no larger than the overall diameter of the tool 40 and no larger than the other components such as the motor located downhole.

A shaft 56 passes axially through the tool 40. The shaft on a first end will pass through the tool 40 and be connected to the electric motor 24 and/or fluid expansion chamber or protector. The shaft on an opposed, second end will pass through the tool 40 and be connected to the submersible pump 16.

Fluid in the wellbore will tend to move to and through the cylindrical filter 54 and into the interior chamber 52 in the directions as shown by arrows 58. Accordingly, the fluid will tend to move into and fill the interior chamber 52.

The shaft 56 is permitted to rotate within the interior chamber of the tool 40 by action of the motor 24. A plurality of centralizer bearings 60 surround the shaft 56 and keep the shaft axially aligned. The bearings 60 have openings therein in order to permit fluid to pass therethrough. The bearings 60 have outside diameters the same as the perforated tubes. The bearings and tubes are held within the housing.

Fluid also passes into and fills an upper portion of the interior chamber 62. An optional pick up charger 64 extends radially from the shaft and has angled fins. Rotation of the shaft 56 rotates the charger and promotes movement of fluid upward into the upper portion of the interior chamber 62.

A mechanism is provided to radially induce fluid in the upper portion of the chamber 62 in order to separate gas from liquid therein. In a preferred embodiment as shown in FIG. 3, the mechanism to radially induce fluid includes a two stage mechanism with a helical fan or staircase 66 extended from and driven by the shaft 56 and paddle wheel 74 extending from the shaft 56. Other mechanisms to radially induce the fluid are possible within the spirit and scope of the invention.

Fluid in the interior chamber 62 is directed axially toward a gas gathering chamber 68. The centrifugal force created by radially inducing the fluid causes liquid to migrate radially outward so that gas tends to gather on an axially central location while liquid migrates outward.

Gas or gas bubbles which are separated from the fluid are delivered out of the interior chamber through a passageway 70 from a gas gathering chamber 68 in an axially central location and progressing radially out of the housing.

Liquid separated from the fluid tending to move radially toward the inner walls of the housing is gathered and then directed from the interior chamber through a liquid passageway 72 to an intake of the pump 16. Accordingly, fluid delivered to the pump is overwhelmingly comprised of liquid and much of the gas content or fraction has been removed.

To install the fluid filtration tool 40, the entire downhole assembly is brought to the surface. The existing pump intake 34 is removed. The fluid filtration tool is then connected to the pump 16. The expansion chamber 26 or motor is connected to the tool and the entire assembly is lowered into the well.

Whereas, the present invention has been described in relation to the drawings attached hereto, it should be understood that other and further modifications, apart from those shown or suggested herein, may be made within the spirit and scope of this invention.

What is claimed is:

1. A dual use fluid filtration tool to separate both solid particles and gas from a fluid wherein said tool is used with a downhole submersible pump having a motor which rotates a shaft, which tool comprises:
   a housing having a substantially cylindrical wall with a plurality of perforations therethrough and an interior chamber therein;
   a removable cylindrical filter surrounding said housing and said interior chamber of said housing to filter solid particles while permitting fluid and gas to pass therethrough;
   at least one centralizer bearing within said interior chamber of said housing to centralize said shaft passing through said interior chamber;
   a pick up charger extending radially from said shaft and having angled fins, such that rotation of said shaft rotates said pick up charger and promotes movement of fluid upward through said interior chamber;
   means to radially induce fluid in said interior chamber in order to separate said gas from liquid;
   means to direct said gas separated from said fluid out of said interior chamber; and
   means to direct said liquid in said interior chamber to said pump.

2. A dual use fluid filtration tool as set forth in claim 1 wherein said housing has a first end connected to a fluid expansion chamber which is connected to said motor and an opposed second end which is connected to said pump.

3. A dual use fluid filtration tool as set forth in claim 1 wherein said housing has a first end connected to said motor and an opposed second end which is connected to said pump.

4. A dual use fluid filtration tool as set forth in claim 1 wherein said means to radially induce fluid in said interior chamber includes a helical staircase rotated by said shaft and a paddle wheel rotated by said shaft.

5. A dual use fluid filtration tool as set forth in claim 1 wherein said means to direct said gas separated from said fluid out of said interior chamber includes a passageway extending from an axially central location in said housing radially out of said housing.

6. A dual use fluid filtration tool as set forth in claim 1 wherein said shaft passes through said interior chamber axially.

7. A dual use fluid filtration tool as set forth in claim 1 wherein said means to direct said liquid in said interior chamber to said pump includes a passageway near said cylindrical wall to an intake of said pump.

8. A dual use fluid filtration tool as set forth in claim 1 wherein said cylindrical filter is replaceable.

9. A dual use fluid filtration tool to separate both solids and gas, wherein said tool is suspended from a downhole submersible pump having a motor which rotates a shaft, which tool comprises:
   a housing having a cylindrical wall with a plurality of perforations therethrough, an interior chamber therein, a first end connected to a fluid expansion chamber, and an opposed, second end connected to said submersible pump;
   a removable cylindrical filter surrounding said housing and said interior chamber of said housing to filter solid particles while permitting fluid including gas to pass therethrough;
   a plurality of centralizer bearings within said interior chamber of said housing to centralize said shaft passing through said interior chamber and passing through said first end and said second end;
   a pick up charger extending radially from said shaft and having angled fins, such that rotation of said shaft rotates said pick up charger and promotes movement of fluid upward through said interior chamber;
   a paddle wheel extending radially from said shaft to radially induce fluid in order to separate gas from liquid;
   an axially aligned gas gathering chamber in said interior chamber in fluid communication with a passageway extending radially out of said housing; and
   a circumferential passageway within said housing which directs said liquid from said interior chamber to said pump.

10. A dual use fluid filtration tool as set forth in claim 9 wherein said cylindrical filter is replaceable.

11. A dual use fluid filtration tool as set forth in claim 10 including a helical staircase which operates with said paddle wheel.

12. A method of using a fluid filtration tool to filter both solid particles and gas from a fluid prior to entering a downhole pump, which method comprises:
   suspending a housing having a substantially cylindrical wall with a plurality of perforations therethrough and an interior chamber therein from said downhole pump submersed in said fluid;
   permitting said fluid and gas therein to pass through a cylindrical filter surrounding said housing and an interior chamber of said housing while blocking solid particles from passing therethrough;

promoting movement of said fluid and gas upward through said interior chamber via a pick up charger having angled fins;

radially inducing fluid in said interior chamber to separate gas from liquid by centrifugal force;

directing said gas separated from said fluid out of said interior chamber through a passageway extending from a gas gathering chamber in an axially central location in said interior chamber radially out of said housing; and directing said liquid in said interior chamber through a passageway near said cylindrical wall of said housing into said pump.

13. A method of using a fluid filtration tool as set forth in claim 12 wherein said cylindrical filter is removable and replaceable.

* * * * *